Patented Oct. 22, 1940

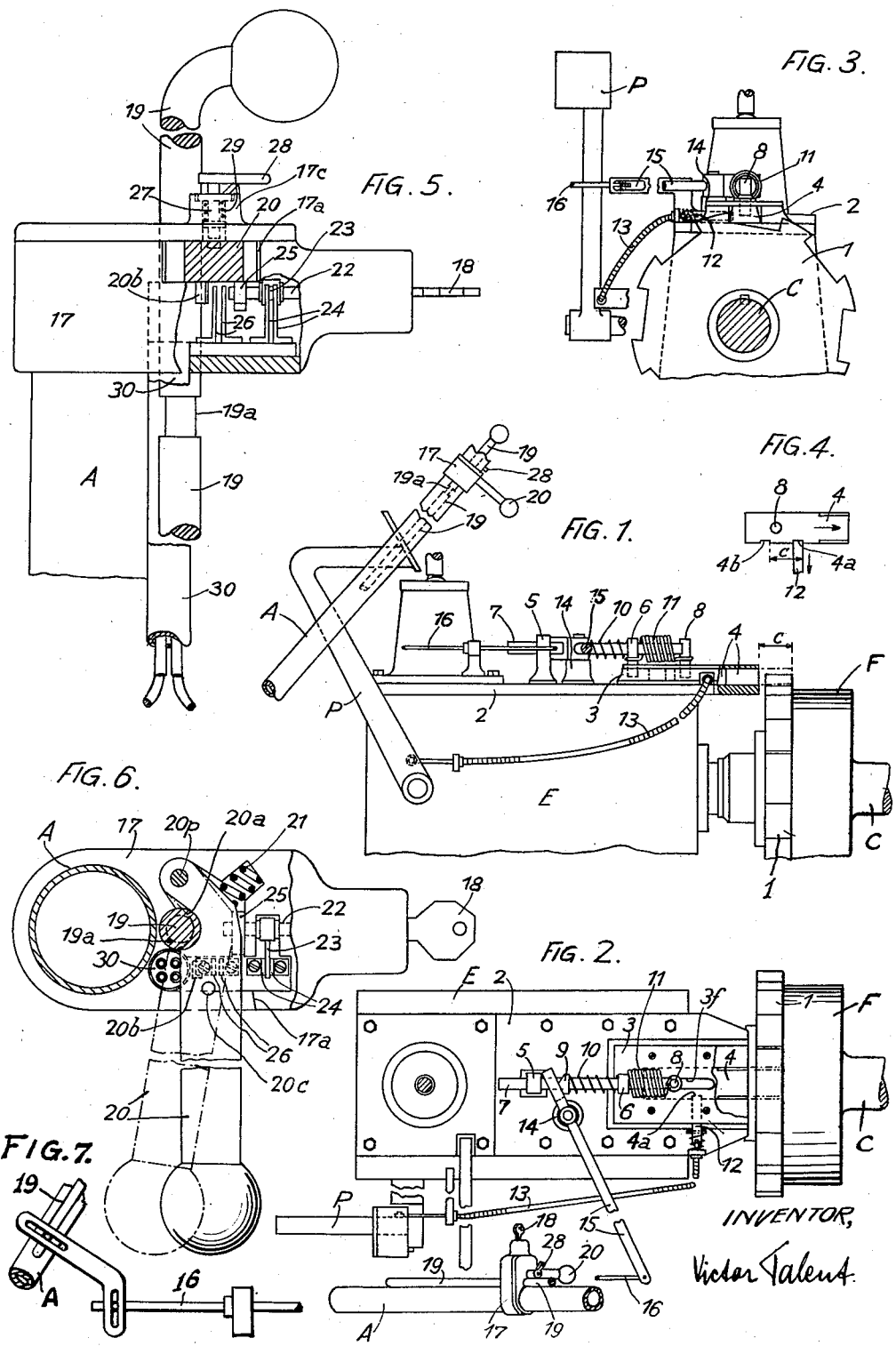

2,218,730

UNITED STATES PATENT OFFICE 2,218,730

LOCKING DEVICE FOR MOTOR CARS

Victor Talent, Zurich, Switzerland

Application March 7, 1938, Serial No. 194,431
In Switzerland March 31, 1937

13 Claims. (Cl. 70—255)

The object of the present invention is the provision of a locking device for motor cars.

Whenever a car is parked on a slope precautions must be taken to prevent it from starting off on its own accord. The present method of locking the speed changing gears and jamming the hand brake is unsatisfactory with respect to safety and is also inconvenient because of the necessary operation of the two means when restarting the car. As a matter of fact, an accidental release of the brake lever is sufficient to set the car in motion and to cause serious accidents.

These drawbacks are eliminated by the device according to the invention in which a locking mechanism is attached to the driving shaft; the locking member of said mechanism can be bolted by means of a bolt connected to the clutch pedal; the device according to the invention is operated by means of an operating means and an unlocking lever which is mechanically connected with the ignition key of the engine, pulling off means connected with the locking member for automatically returning it to its rest position when said bolt is brought back by depressing the clutch pedal and the accelerator after having brought back the unlocking lever, the mechanical connection of the unlocking lever with the ignition key is such that this key can only be turned to cut off the ignition current when the said unlocking lever is situated in its locking position and the latter cannot be returned into unlocking position unless the key has again been operated to close the ignition circuit.

Preferably the locking mechanism consists of a cogged disc mounted on the driving shaft and of a pawl gliding axially and being adapted to engage the cogs of the cogged disc.

This arrangement provides for an absolutely reliable stop stationed on a motor car stationed on a slope, and a very simple operation of the device, especially when starting; it suffices to move back the unlocking lever and depress the clutch pedal when the motor car is stationed on the level to release the locked driving shaft, the hands of the operator being thus free for the other operations because the pulling off means return the locking member automatically to its unlocking position. If the motor car is started on a slope the accelerator must of course be operated.

Moreover an absolute protection is obtained against any fraudulent use or theft of the motor car by third persons who are not in possession of a key.

An embodiment of the invention is shown by way of example in the annexed drawing, in which:

Figure 1 is a side elevation of a device according to the present invention.

Figure 2 is a plan view of the device shown in Figure 1.

Figure 3 is an end view of the locking device according to the present invention.

Figure 4 illustrates a detail of the present invention.

Figure 5 shows, on a larger scale, a part sectional elevational view of the operating mechanism and Figure 6 is a plan view of this operating mechanism with the unlocking lever.

Figure 7 is an isometric view of a detail of the mechanism according to the present invention.

In the drawing C designates the drive shaft of a motor car. On this shaft a lock member in the form of a cogged disc 1 is mounted, the cogs having a dovetail profile. A base member including a bed plate 2 is mounted on the casing of the speed changing gear box E which plate at its extreme rear carries a guide block 3 in which a pawl or key member 4 glides longitudinally and forms the locking means in its extreme right position. This pawl extends between the cogs of the cogged disc 1. The spaces on the disc 1 in between the cogs are considerably wider than the cogs and the pawl, so that the latter will easily enter said spaces when it is pushed backwards into locking position, and it can likewise be withdrawn from this position into unlocking position without great effort.

A support 5 is mounted on the center part of the bed plate 2 and another support 6 on the forward part of the guide block 3. In these two supports an actuating rod 7 is placed so as to glide longitudinally. The block 3 is provided with a longitudinal groove 3f which is in line with the rod 7 and a pin 8 passing through this groove is fixed vertically on the pawl 4. A cam 9 is fixed on the rod 7 between the supports 5 and 6 and between this flange and the support 6 there is a helical spring 10 surrounding the rod 7. A helical reaction spring 11 likewise surrounding the rod 7 is fixed at one end to the support 6 and at the other end to the pin 8. Rod 7 is adapted to temporarily abuttingly engage pin 8 for pushing pawl 4 into locking position against the action of springs 10 and 11. Arresting means for arresting the locking means 4 in desired position will now be described. In the guide block 3 slides a bolt 12 which is pressed by the action of a spring into a locking notch 4a (Figure 4)

in the pawl 4; the latter is provided with another locking notch 4b at a distance c from notch 4a which distance corresponds to the stroke of the pawl. The bolt 12 can be withdrawn from the locking notch by means of a flexible connecting means 13 one end of which is connected to bolt 12 and the other end of which is fastened to the clutch operating pedal P. In view of the shallowness of the locking notches 4a and 4b and consequently the short stroke of the bolt 12, the connection 13 makes a very restricted movement only and is therefore fixed at a very short distance from the pivot of the pedal. The connecting means 13 comprise a sheath which is fixed on the gear box E.

The bed plate 2 carries a pivot 14 for a two-arm lever 15 the short arm of which forms a fork surrounding the rod 7 between the support 5 and the cam 9. To the end of the long arm of lever 15 one end of a rod 16 is connected the other end of which is fastened to an operating mechanism fixed to the steering shaft A.

Figures 5 and 6 show this operating mechanism. An oblong hollow block 17 is attached to the steering shaft A, enclosing at its extreme end the ignition lock which is of conventional construction and is used to control the ignition circuit by means of a key 18. The operating or actuating rod 19 which is connected with rod 16 extends along the steering shaft A and through the block 17; at its free end, which is curved, it carries an operating button, and in its part which extends through the block 17 is provided with an annular groove 19a. A holding and release means in the form of an unlocking lever 20 is pivoted at 20p to block 17; it has near its pivot-end an indentation 20a which encompasses groove 19a of the rod 19 when said groove is in position to face lever 20. Normally groove 19a is located below lever 20, as on Figure 5. A helical spring 21 placed in the block 17 and being situated opposite the indentation 20a abuts against a face provided on the lever 20; this spring tends to push lever 20 towards the left on Figure 6. An extension rod 22 of the lock cylinder carries a contact point 23 which penetrates between two contact blades 24 fixed to the interior of the block 17 and at the rear end of this rod 22 there is placed a cam 25 whose one plane face of which abuts lever 20 when it is in rest or unlocking position so that rotation of the lock cylinder is prevented. In the rear of the contact blades 24 are two contact blades 26 which can be brought into contact with each other by means of a boss 20b fixed to the lower face of the lever 20. The pair of contact blades 24 is intercalated in the ignition circuit, and the pair of blades 26 is in the circuit of the starter motor resistance. The electric wire connected with these contact blades are united in a cable 30 fixed to the steering column A. The rocking movement of the unlocking lever 20 in the direction to the right on Figure 6 is limited by an abutment 17a on block 17.

In order to lock momentarily the unlocking lever in its rest position a retaining means having a spur 27 has been provided which is arranged in a boss 17c and mounted on the upper face of the block 17 and adapted to enter into an aperture 20c of the lever 20 (Figure 6), a spring 29 serving to press this spur downwards. At its end the spur 27 bears a cam head 28 which, when turned, allows under the action of the spring 29 a downward movement of the spur 27 which then locks the lever 20 when it is desired to use the locking mechanism instead of the hand brake, not for the purpose of braking, but to keep the car on a slope, for instance, with the intention of changing the direction of propulsion or of turning.

In most cars the disc 1 can be combined with the drum F of the hand brake so that the device does not take up much space.

The device thus described operates as follows:

In the drawing the device is shown in the position during driving or at rest. If it is desired to park the car on a slope the clutch pedal P is pressed in such a way that the connection 13 withdraws the bolt 12 from its locking notch 4a so that the pawl 4 is released. The button of the operating rod 19 is then raised in such a way that the indentation 20a of the unlocking lever 20 which lever swings towards the left as seen in Fig. 6 under the pressure of the spring 21 coacts with groove 19a of rod 19, as indicated in dash and dotted lines in Figure 6. The lever 20 having released the cam 25 by its movement towards the left, the key 18 can be turned and the ignition circuit of the engine cut off after which the key is withdrawn. The lever 20 is now locked in its position owing to the fact that the cam 25 is pressing against the right hand face of this lever so as to prevent any return movement of the latter.

The striker rod 16 being connected with rod 19 causes movement of lever 15 around the pivot 14 when rod 19 ascends. The short arm of this lever which presses on the flange 9 thrusts rod 7 to the right and, by means of pin 8, pushes pawl 4 to the right so as to cause it to engage between the cogs of cogged disc 1 whereby spring 10 is compressed whereas spring 11 is expanded until notch 4b engages the bolt 12. Pawl 4 is now locked and blocks the cogged disc 1 and with it shaft C and the wheels of the motor car. The car is thus locked with absolute security, and at the same time any fraudulent use or theft of the car is prevented. Moreover the cog of the disc the face of which presses on the pawl has a locking effect on the latter. The necessary operations for re-starting the car depend on the direction of the slope, i. e. as to whether the motor car is parked on an up or a down grade. In order to start on an up grade the key 18 is introduced into the ignition lock and turned so as to cause the closing of the ignition circuit at the contacts 23/24. At the same time the cam 25 turns so as to release the unlocking lever 20. This lever 20 is now turned towards the right (on Figure 6). The lever 20 releases the operating rod 19 of rod 16 so as to bring back the latter to its rest position under the action of the spring 10. When the lever 20 moves toward abutment 17a of the block 17, the boss 20b of the lever closes for a moment the contact 26 of the starting resistance, this contact being reopened when the lever returns to its rest position. This latter operation then starts the engine, which can be done without difficulty, as each time that the car is stopped with the intention of parking, the engine is allowed to run idly by operating the change speed gear lever. Now the clutch pedal P is pressed in such a way that the bolt 12 releases pawl 4. The change speed lever is then operated for the speed required, and finally the accelerator and the clutch pedal P are operated simultaneously. The drive shaft with the cogged disc 1 now begins to rotate, the locking action on the pawl 4 by the disc cog is likewise suspended so that the pawl 4 can be withdrawn by its spring 11 to be brought back to its rest position.

During nearly all these operations the chauffeur can easily use both his hands for driving the car and other operations (signals, headlights, etc.).

For starting on a down slope one proceeds as described above but a slight backward movement must then be given to the motor car in order to release the pawl 4 from the lateral pressure exercised by the cogged disc 1.

Without the ignition key no third party can displace a car provided with this device; hence it is not only a safety device for parking on slopes, but also a protection against theft of the car or its fraudulent use by third persons.

I wish it to be understood that I do not desire to be limited to the exact details of construction shown and described, for obvious modifications will occur to a person skilled in the art.

I claim:

1. A locking mechanism for motor vehicles having an ignition switch, a drive shaft and a clutch operating member, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, an arresting means for arresting operation of said locking means, said arresting means being operatively connected with said clutch operating member and being adapted to be released simultaneously with the release of the clutch, an operating mechanism operatively connected with said locking means and being adapted to be engaged by said interlocking means in locking position thereof, whereby the operation of said locking means is dependent on the position of said interlocking means and thereby on the position of said key operated member and of the ignition switch opening and closing member connected thereto.

2. A locking mechanism as claimed in claim 1 in which said lock member includes a plurality of cog members disposed at equal distance from and around said drive shaft and being spaced at equal distances from one another, and in which said locking means comprises a pawl member adapted to be slid into the spaces between said cog members and taking up only part of the spaces between said cog members.

3. A locking mechanism as claimed in claim 1 in which said lock member includes a plurality of cog members disposed at equal distance from and around said drive shaft and being spaced at equal distances from one another, and in which said locking means comprise a pawl member adapted to be slid into the spaces between said cog members, an actuating rod adapted to be operatively connected with and being disposed substantially parallel to said pawl member, and resilient means connected with and disposed around said rod and adapted to resiliently hold said rod in a predetermined position.

4. A locking mechanism for motor cars as claimed in claim 1 in which said locking means comprise a base member, a locking member proper slidingly connected with said base member, an acuating member connected with said locking member proper, and a plurality of support members connected with said base member and movably supporting said actuating member.

5. A locking mechanism for motor cars having a drive shaft, a clutch operating member, and a key operated ignition switch, said locking mechanism comprising in combination a lock member connected with said drive shaft, a locking means adapted to engage and lock said lock member, an arresting means for arresting operation of said locking means, said arresting means being operatively connected with said clutch operating member and being adapted to be released simultaneously with the clutch, an actuating means operatively connected with said locking means, a holding and release means operatively connected with said actuating means for holding said actuating means in position for causing engagement of said locking means and said lock member and for releasing said actuating means, lock means connected with said ignition switch and engaging said holding means, when the latter are in holding position, and preventing release of said holding and release means and of said actuating means.

6. A locking mechanism for motor vehicles having an ignition switch, a drive shaft and a clutch operating member, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member and having a plurality of notches, an arresting means adapted to individually cooperate with said notches for arresting said locking means in either locking or unlocking position, said arresting means being operatively connected with said clutch operating member and being adapted to be released simultaneously with the release of the clutch, an operating mechanism operatively connected with said locking means and being adapted to be engaged by said interlocking means in locking position thereof, whereby the operation of said locking means is dependent on the position of said interlocking means and thereby on the position of said key operated member and of the ignition switch opening and closing member connected thereto.

7. A locking mechanism for motor vehicles having an ignition switch and a drive shaft, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, and an operating mechanism operatively connected with said locking means and being adapted to be engaged by said interlocking means in locking position thereof, whereby the operation of said locking means is dependent on the position of said interlocking means and thereby on the position of said key operated member and of the ignition switch opening and closing member connected thereto, said locking means comprising a base member, a locking member proper movably connected with said base member, and resilient retaining means connected with said base member and with said locking member for retaining said locking member in unlocking position.

8. A locking mechanism for motor vehicles having an ignition switch, a drive shaft and a clutch operating member, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, an arresting means for arresting operation of said locking means, said arresting means being operatively connected with said clutch operating member and being adapted to be released simultaneously with the release of the clutch, and an operating mechanism operatively connected with said locking means and being adapted to be engaged by said interlocking means in locking position thereof, whereby the operation of said locking means is dependent on the position of said interlocking means and thereby on the position of said key operated member and of the ignition switch opening and closing member connected thereto, said locking means comprising a base member, a locking member proper movably connected with said base member, an actuating member adapted to be temporarily operatively connected with said locking member proper and being movably connected with said base member, resilient retaining means connected with said base member and with said actuating member for resiliently retaining said actuating member in disconnected position with respect to said locking member, other resilient means connected with said base member and with said locking member for holding said locking member is unlocking position, and an actuating lever swingably connected with said base member and having an end engaging said actuating member and another end operatively connected with said operating mechanism for actuating said actuating member and said locking member connected thereto against the action of said resilient means.

9. A locking mechanism for motor vehicles having an ignition switch and a drive shaft, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, and an operating mechanism operatively connected with said locking means and being adapted to be engaged by said interlocking means in locking position thereof, whereby the operation of said locking means is dependent on the position of said interlocking means and thereby on the position of said key operated member and of the ignition switch opening and closing member connected thereto, said locking means comprising a base member, a locking member proper movably connected with said base member, resilient retaining means connected with said base member and with said locking member for retaining said locking member in unlocking position, and an actuating lever swingably connected with said base member and having an end adapted to be operatively connected with said locking member and another end operatively connected with said operating mechanism for actuating said locking member against the action of said resilient means.

10. A locking mechanism for motor vehicles having an ignition switch and a drive shaft, said locking mechanism comprising, in combination, a key operated member, an ignition switch opening and closing member and an interlocking means connected with said key operated member, said interlocking means being adapted to be moved to locking and unlocking position, upon operation of said key operated member and being in locking position when said switch is open and being in unlocking position when said switch is closed, a lock member connected with said drive shaft, a locking means adapted to engage and lock said lock member, actuating means operatively connected with said locking means, and a holding and release means operatively connected with said actuating means for holding said actuating means in position for causing engagement of said locking means and of said lock member and for releasing said actuating means and said locking means from said lock member, said holding and release means, when in releasing position, being adapted to engage and to retain said interlocking means in unlocking position thereof whereby said switch opening and closing member is in switch closing position.

11. A locking mechanism for motor vehicles having a steering column, an ignition switch and a drive shaft, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, actuating means operatively connected with said locking means, said actuating means including an actuating member disposed substantially parallel and adjacent to said steering column and being movable along said column, and a holding and release means adapted to engage said interlocking means in locking and unlocking position thereof and being adapted to be temporarily operatively connected with said actuating member for holding said member in fixed position relatively to said steering column and for holding said actuating means in a position in which said actuating means cause engagement of said locking means and of said lock member and for releasing said actuating member and said actuating means for releasing said locking means from said lock member, whereby operation of said key operated member and of said ignition switch opening and closing member connected thereto and of said holding and release means and of said actuating means is interdependent.

12. A locking mechanism for motor vehicles having an ignition switch and a drive shaft, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, actuating means operatively connected with said locking means, and a holding and release means adapted to hold said actuating means in a position causing engagement of said locking means and of said lock member and to release said actuating means for releasing said locking means from said lock member, said holding and release means being adapted to engage said interlocking means in locking and unlocking position thereof and rendering operation of said key operated member and of said switch opening and closing member connected thereto and manipulation of said holding and release means interdependent, and retaining means operatively connected with said holding and release means for retaining said holding and release means in releasing position.

13. A locking mechanism for motor vehicles having a starting switch, an ignition switch and a drive shaft, said locking mechanism comprising, in combination, a key operated member, an ignition switch opening and closing member and an interlocking means connected with said key operated member, said interlocking means being movable to locking and unlocking position, a lock member connected with said drive shaft, a locking means adapted to engage and lock said lock member, actuating means operatively connected with said locking means, and a holding and release means adapted to hold said actuating means in a position causing engagement of said locking means and of said lock member and to release said actuating means for releasing said locking means from said lock member, said holding and release means, when in releasing position, being adapted to engage and close said starting switch and being adapted to engage said interlocking means in unlocking position thereof and, when in holding position, being adapted to disengage and open said starting switch and to engage said interlocking means in locking position thereof whereby operation of said starting switch and of said key operated member and of said switch opening and closing member and of said holding and release means is interdependent.

VICTOR TALENT.